United States Patent [19]

Hsueh et al.

[11] Patent Number: 4,802,533

[45] Date of Patent: Feb. 7, 1989

[54] METHOD OF CONTROLLING PERMEABILITY DAMAGE OF HYDROCARBON FORMATIONS DURING STEAM INJECTION WHILE PREVENTING PIPE CORROSION

[75] Inventors: Liming Hsueh, Buena Park; Marion G. Reed, Hacienda Heights, both of Calif.

[73] Assignee: Chevron Research Company, San Francisco, Calif.

[21] Appl. No.: 197,950

[22] Filed: May 24, 1988

Related U.S. Application Data

[63] Continuation of Ser. No. 064,265, Jun. 18, 1987, abandoned, which is a continuation-in-part of Ser. No. 654,331, Sep. 24, 1984, abandoned, which is a continuation-in-part of Ser. No. 848,662, Apr. 4, 1986, abandoned, and a continuation-in-part of Ser. No. 909,971, Sep. 22, 1986, abandoned.

[51] Int. Cl.$^4$ .................. E21B 43/22; E21B 47/00; E21B 47/06
[52] U.S. Cl. .................. 166/252; 166/272; 166/303; 166/902
[58] Field of Search ......... 166/250, 252, 272, 292, 166/300, 303, 305.1, 902; 122/459

[56] References Cited

U.S. PATENT DOCUMENTS

| | | | |
|---|---|---|---|
| 3,193,009 | 7/1965 | Wallace et al. | 166/272 |
| 3,237,692 | 3/1966 | Wallace et al. | 166/303 |
| 3,476,183 | 11/1969 | Haynes, Jr. et al. | 166/272 |
| 3,543,858 | 12/1970 | Nooner et al. | 166/303 |
| 3,807,500 | 4/1974 | Thigpen, Jr. et al. | 166/303 |
| 4,068,716 | 1/1978 | Allen | 166/271 |
| 4,475,595 | 10/1984 | Watkins et al. | 166/303 |
| 4,476,930 | 10/1984 | Watanabe | 166/279 |
| 4,522,263 | 6/1985 | Hopkins et al. | 166/272 |
| 4,549,609 | 10/1985 | Watkins et al. | 166/303 |
| 4,572,296 | 2/1986 | Watkins | 166/303 |
| 4,580,633 | 4/1986 | Watkins et al. | 166/295 |
| 4,625,802 | 12/1986 | Sydansk | 166/292 |
| 4,714,112 | 12/1987 | Nigrini et al. | 166/252 |

OTHER PUBLICATIONS

Smith, C. F. et al, "Potassium, Calcium Treatments Inhibit Clay Swelling", *The Oil and Gas Journal*, Nov. 30, 1964, pp. 80 and 81.

*Primary Examiner*—George A. Suchfield
*Attorney, Agent, or Firm*—S. R. La Paglia; E. J. Keeling

[57] ABSTRACT

The present invention provides a method for inhibiting permeablility damage of a hydrocarbon formation containing clay minerals in the vicinity of a well penetrating the formation while inhibiting pipe corrosion. It comprises: (1) injecting a wet steam comprising (a) an amount of ammonium ions to produce an ammonium ion concentration in the vapor phase condensate of the wet steam effective to inhibit the permeability damage of the formation in the vicinity of the vapor phase, and (b) an amount of a bicarbonate salt of the alkali metals, or mixtures thereof, effective to raise the pH of the liquid phase of the wet steam within the range of from about 7.5 to about 10.5; and (2) monitoring the pH of the residual liquid phase and continually adjusting the addition of the bicarbonate salt to maintain the pH within the range of from about 7.5 to about 10.5.

25 Claims, 2 Drawing Sheets

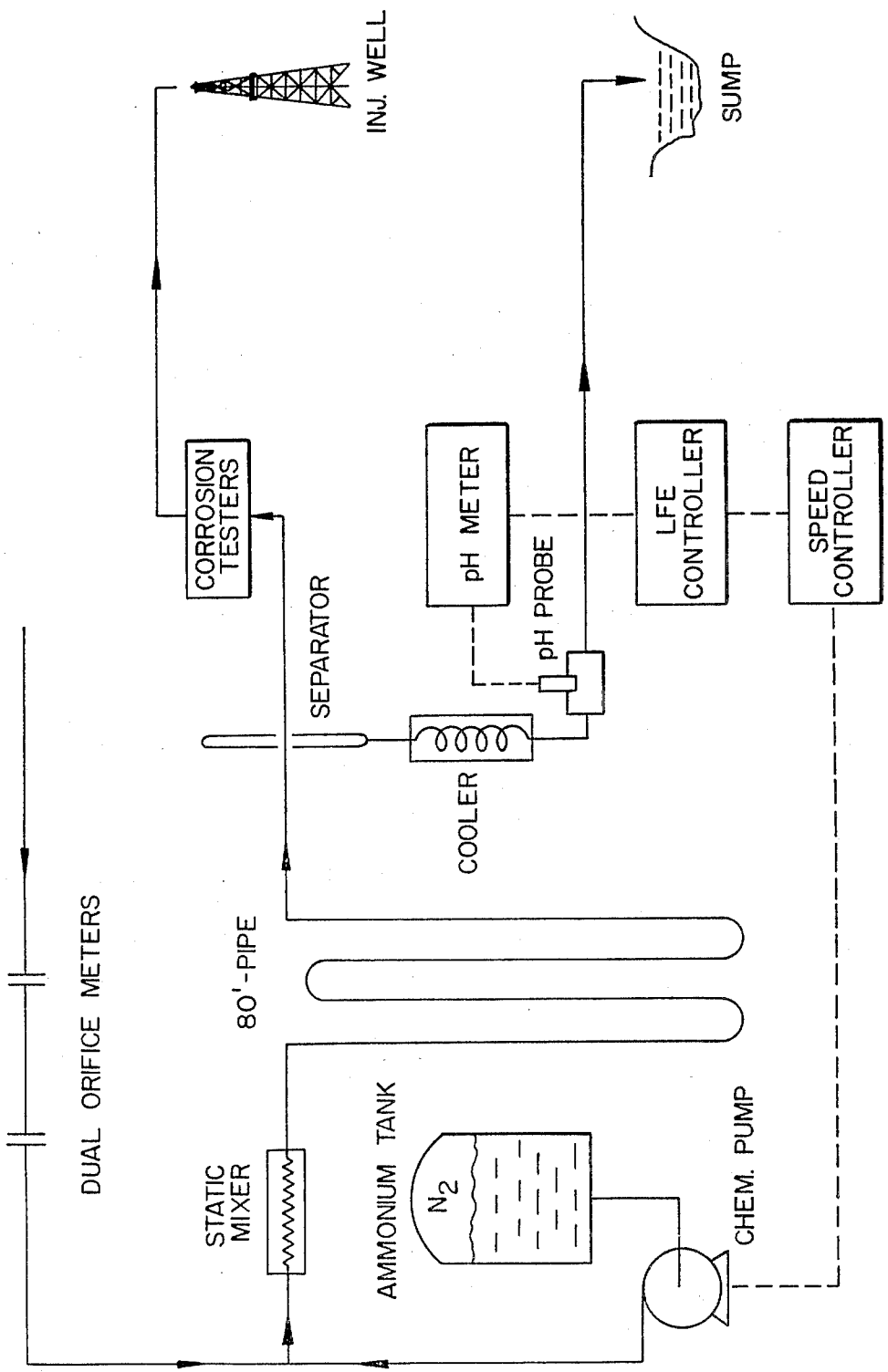
FIG._1.

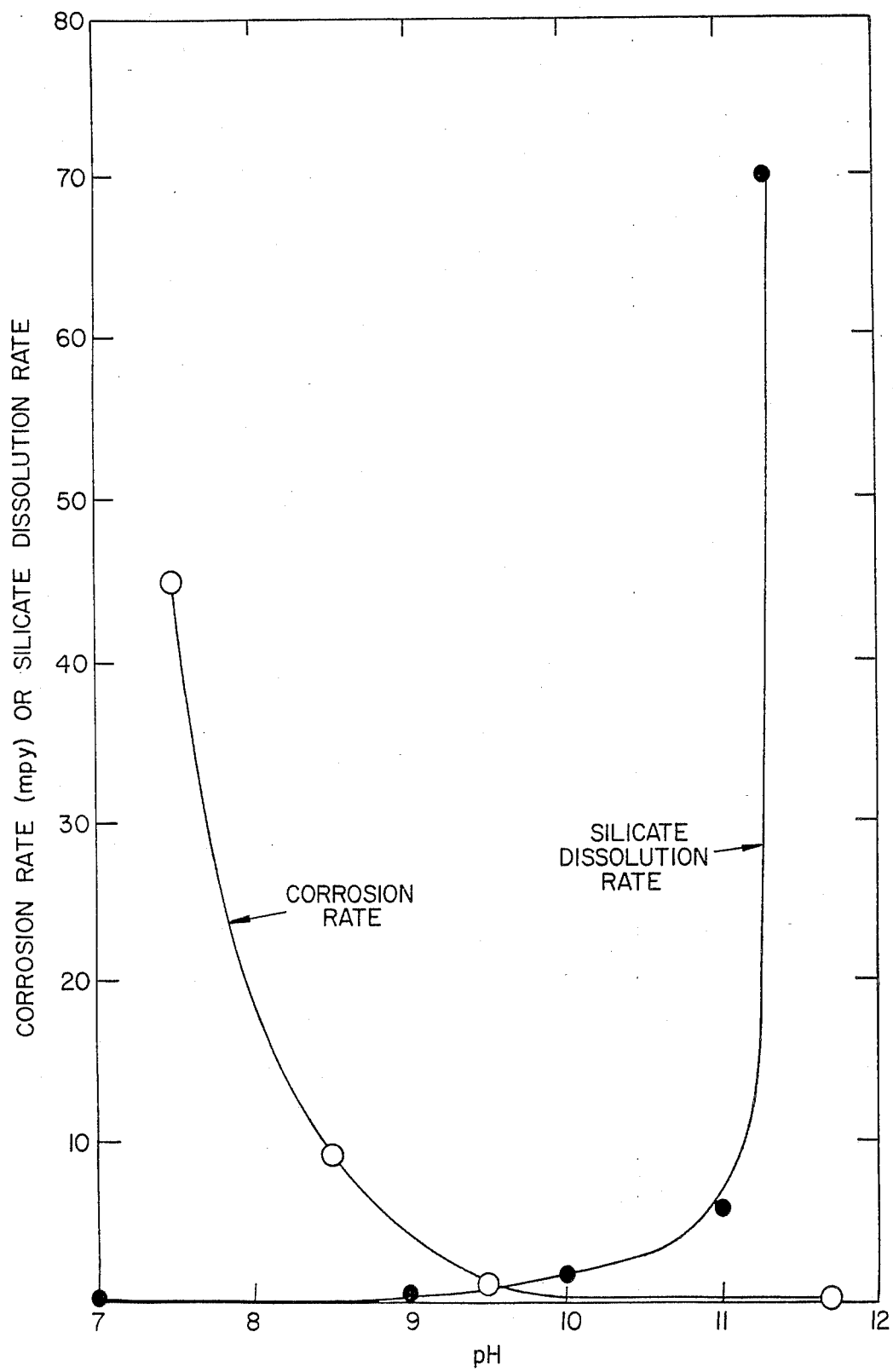
FIG._2.

METHOD OF CONTROLLING PERMEABILITY DAMAGE OF HYDROCARBON FORMATIONS DURING STEAM INJECTION WHILE PREVENTING PIPE CORROSION

CROSS-REFERENCE TO RELATED APPLICATIONS

This is a continuation of application Ser. No. 064,265, filed June 18, 1987, now abandoned, entitled "Method of Controlling Permeability Damage of Hydrocarbon Formations During Steam Injection While Preventing Pipe Corrosion", which is a continuation-in-part of application Ser. Nos. 848,662, filed Apr. 4, 1986, now abandoned entitled "Method for Controlling Rock Dissolution and Pipe Corrosion During Oil Well Steam Injection," which is a continuation-in-part of application Ser. No. 654,331, filed Sept. 24, 1984, now abandoned, entitled "Method for Controlling Rock Dissolution During Oil Well Steam Injection," which and Ser. No. 909,971, filed Sept. 22, 1986, now abandoned entitled "Method of Controlling Permeability Damage of Hydrocarbon Formations During Steam Injection Using Ammonium Ions, Bicarbonate Ions, and Potassium Ions."

The present invention relates to a method for inhibiting permeability damage of a hydrocarbon formation containing clay minerals. Furthermore, the present invention relates to a method for inhibiting formation dissolution while preventing pipe corrosion.

BACKGROUND OF THE INVENTION

Steam injection techniques, such as steam stimulation and steam flooding, have been used to recover immobile heavy oils and to enhance the oil recovery from older wells where the natural field pressures are too low for unassisted production. They are designed to reduce the reservoir flow resistance by reducing the viscosity of the crude.

These techniques involve injection into the well of a high temperature wet steam in cycles of thousands of cubic meters at a time. Wet steam is a mixture of steam and varying amount of hot liquid water, the quality of wet steam generally ranges from 35% to 80%. Because of the density difference between the two phases of the wet steam, the vapor phase preferentially enters the upper part of the injection interval and the liquid phase preferentially enters the lower part.

When groundwater, river water, or lake water is used as feedwater to generate wet steam, the liquid water phase is generally basic (having a pH in excess of 11) and the vapor phase of the wet steam, when condensed, is acidic (having a pH of about 4.0 to 4.5). This partitioning is due to the bicarbonate contained in the source water decomposing to $CO_2$ and $OH^-$, as shown in Equation 1 below:

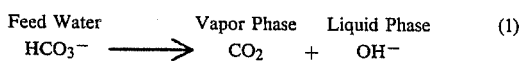

The $CO_2$ is volatile and enters the vapor phase, which produces a low pH in the liquids condensed from the vapor phase. The $OH^-$ ion enters the liquid phase and causes a high pH in the liquid phase.

Associated with using these wet steams in steam injection is the problem of silica dissolution. Coupled with high fluid temperatures, both the liquid phase and the liquids from the condensed vapor phase are capable of rapidly dissolving reservoir rocks, such as sandstone, carbonate, diatomite, porcellanite and the like. For pH values above 11.0 and temperatures above 177° C., the silica and silicate dissolution rates are orders of magnitude higher than at neutral/ambient conditions. Also, because the reactions for dissolving siliceous reservoir rocks are base consumers, the liquid pH decreases rapidly as the fluid moves away from the wellbore, causing the dissolution reactions and solubility to diminish rapidly and causing the reaction products downstream (such as aluminosilicates and other metal silicates) to precipitate in the pores. This precipitation decreases the formation permeability and decreases well injectivity.

This problem of silica dissolution was addressed in U.S. Pat. Nos. 4,475,595; 4,572,296; and 4,580,633. All three of those patents are incorporated herein by reference for all purposes. U.S. Pat. No. 4,475,595 discloses adding an ammonium inhibitor to the feedwater or to the wet steam. U.S. Pat. No. 4,572,296 discloses adding an ammonium inhibitor and a compound which hydrolyzes in steam, providing a buffering effect in the liquid phase to prevent excessive pH reduction. U.S. Pat. No. 4,580,633 discloses adding an ammonium inhibitor and an organosilicon compound. In each case, the amount of added ammonium inhibitor is determined by the bicarbonate concentration of the steam.

Also associated with using these wet steams is the problem of permeability damage of hydrocarbon formations containing clay. Formations that contain clay minerals are susceptible to water-rock interactions that cause the clay to disperse and migrate. When they move downstream, they tend to bridge in pore constrictions to form miniature filter-cakes throughout the pore network. This can decrease steam injectivity in the lower interval where liquid water is injected and also in the upper interval where vapor phase condensation takes place. In some cases, clay structural expansion may contribute to this decrease in permeability.

U.S. Pat. No. 4,549,609 discloses an attempt to solve the problem of permeability damage by injecting an ammoniacal nitrogen-containing compound. U.S. Pat. No. 4,549,609 is incorporated herein by reference for all purposes. Since the ammoniacal nitrogen-containing compound stays in the vapor phase of the wet steam, the method disclosed in U.S. Pat. No. 4,549,609 fails to prevent permeability damage in those areas exposed to the liquid phase. Also, the amount of ammoniacal nitrogen-containing compound that can be added without acidic corrosion of the well pipe is limited by the bicarbonate concentration found in the feedwater.

U.S. Pat. No. 4,476,930 discloses a method of inhibiting scale and corrosion in the vapor phase but fails to address the problem of corrosion in the liquid water phase of wet steam caused by adding ammoniacal nitrogen-containing compound.

SUMMARY OF THE INVENTION

The present invention provides a method for inhibiting permeability damage of a hydrocarbon formation containing clay minerals in the vicinity of a well penetrating the formation while inhibiting pipe corrosion. It comprises: (1) injecting a wet steam comprising (a) an amount of ammonium ions to produce an ammonium ion concentration in the vapor phase condensate of the wet steam effective to inhibit the permeability damage of the formation in the vicinity of the vapor phase, and (b) an amount of a bicarbonate salt of the alkali metals, or mixtures thereof, effective to raise the pH of the liquid phase of the wet steam within the range of from about 7.5 to about 10.5; and (2) monitoring the pH of the residual liquid phase and continually adjusting the addition of the bicarbonate salt to maintain the pH within the range of from about 7.5 to about 10.5.

The amount of bicarbonate salt in the wet steam is controlled to cause the pH of the liquid phase to be in the range of from about 7.5 to about 10.5, preferably in the range of from about 8.5 to about 9.5. When the pH of the residual liquid phase is above 10.5, the dissolution rate of silica becomes unacceptably high. When the pH of the residual liquid phase is below 7.5 the corrosion rate of the well pipe becomes unacceptably high.

In a preferred embodiment, the wet steam also comprises an amount of a salt of an alkali metal selected from the group consisting of potassium, rubidium, and cesium to form an alkali metal concentration in the liquid phase of the wet steam effective to inhibit permeability damage of the formation in the vicinity of the liquid phase of the wet steam.

BRIEF DESCRIPTION OF THE DRAWINGS

FIG. 1 is a schematic diagram of the field test facility used to test this invention.

FIG. 2 is a plot of the effect of pH on corrosion rate and silica dissolution.

DETAILED DESCRIPTION OF THE INVENTION

In its broadest aspects, the present invention involves a method for inhibiting permeability damage of hydrocarbon formations containing clay minerals and for improving the injectivity of steam into those formations. One of the considered causes of poor injectivity and productivity is the dissolution of gravel packs and formation sands. Products of this dissolution precipitate downstream of the dissolution zone and cause permeability damage which results in loss of injectivity. Another mechanism causing the decline is permeability damage resulting from interactions between formation clay minerals and condensed steam or injected liquid phase water. The present invention solves the problems of silica dissolution and permeability damage by clay minerals, and pipe corrosion.

Clay Stabilization in Vapor Phase Condensation Region

Ammonium salts are highly effective for clay stabilization in the vapor phase condensation region. When the ammonium passes through the generator, it decomposes to ammonia and acid. The ammonia is an alkaline gas that partitions to the gas phase, the acid partitions to the liquid phase. This is opposite to the way bicarbonate decomposes, where the acid component partitions to the gas phase and the base component partitions to the liquid phase. When one adds an amount of ammonium salt chemically equivalent to the concentration of bicarbonate, both the liquid phase and the vapor phase condensate of the generator effluent are neutralized by the decomposition reactions, as shown by Equation 2 below.

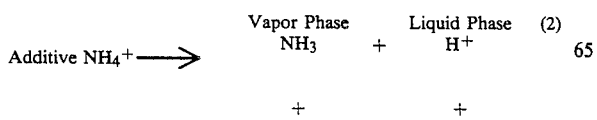

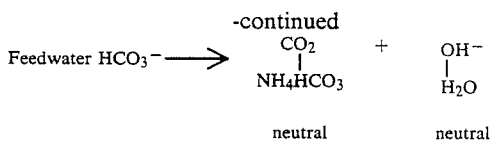

The ammonium ions at the point of vapor phase condensation help prevent permeability damage and maintain near neutral pH's on both the vapor phase condensation region and the liquid phase injection region.

In the present invention, an amount of ammonium ions is added to the wet steam to produce an ammonium ion concentration in the vapor phase condensate of the wet steam effective to inhibit permeability damage of clay mineral-containing hydrocarbon formations in the vicinity of the vapor phase of the injected wet steam and to improve the injectivity of the wet steam into the formation at the same location. Preferably, the ammonium ion concentration in the vapor phase condensate of the wet steam is less than 2 N, more preferably, from 0.01 N to 0.5 N. Preferably, the source of ammonium is ammonium sulfate, ammonium chloride, ammonium hydroxide, ammonium acetate, ammonium nitrate, or mixtures thereof, more preferably ammonium bicarbonate, ammonia carbonate, and mixtures thereof.

To determine the desired amount of ammonium ions, the preferred method is to take core samples in the region in question and determine the permeability of the core to solutions containing different ammonium ion concentrations, starting at the highest concentration. Permeability is plotted as a function of ammonium ion concentration. The results will be a curve of diminishing effect with increasing concentrations. Each added increment of ammonium ion concentration will give improved permeability, but the improvement will be smaller for each added increment. In other words, doubling the ammonium ion concentration will always improve permeability, but not by double. The decision of a particular desired amount of ammonium ions is a trade-off between the cost of the added ammonium ions and the value of the increased permeability.

Normally, the amount of ammonium salts which can be added to feedwater is limited by the chemistry of feedwater. If the bicarbonate concentration is lower than the total ammonium concentration, decomposition of the excessive ammonium can lower the pH of the liquid phase sufficiently to cause severe corrosion of steel tubular goods in the steam injection lines. When one wishes to add more ammonium to the feedwater than can be neutralized by the bicarbonate in the feedwater, one adds a source of bicarbonate ions to feedwater to balance the over-corrected feedwater. The source of bicarbonate ions is added to raise the pH of the liquid phase of the wet steam to within the range of from 7.5 to 10.5, preferably from 8.5 to 9.5. The source of bicarbonate ions can be sodium bicarbonate, potassium bicarbonate, and mixtures thereof. The preferred method of determining the amount of bicarbonate ions added is to determine the desired amount of ammonium ions, determine the amount of bicarbonate ions already in the feedwater, then calculate the equivalent amount of bicarbonate ions needed to neutralize the ammonium ions.

Reduction of Pipe Corrosion

In addition, it is desirable to monitor the pH of the residual liquid phase and to continually adjust the addition of bicarbonate salt to maintain the pH within the range of from about 7.5 to 10.5. Preferably, the pH rnnge is maintained between 8.5 and 9.5. When the pH of the residual liquid phase is above 10.5, the dissolution rate of silica becomes unacceptably high. When the pH of the residual liquid phase is below 7.5, the corrosion rate of the well pipe becomes unacceptably high.

Oxygen in the feedwater to the steam generator cannot be tolerated because it causes severe corrosion. Thus, a chemical oxygen scavenger, such as sodium sulfite, should be added to the feedwater to maintain the oxygen concentration below 30 ppb.

Clay Stabilization in the Liquid Phase

Many clay stabilizers, such as zirconyl salts, hydroxyaluminum, cationic polymers, quaternary ammonium salts and fluoboric acid, are available from commercial oil field service companies for use in the liquid phase. Because of the high cost of these chemicals, they are generally used to control clay problems within a very few feet of the wellbore.

The portion of the well receiving liquid phase water can be protected by maintaining a high total metal salt concentration in the injected liquid phase. Only alkali metals are practical because of precipitation and scaling problems associated with salts of polyvalent cations. Some of the alkali metal salts are especially effective because of their special reactions with some clay minerals. This special group includes potassium, rubidium, and cesium salts, but of these potassium is preferred because of its cost and availability. Thus, chemical additions to feedwater for protecting the formation receiving the liquid phase is practically limited to potassium salts. It is important to note that these metal salts do not enter the vapor phase and therefore they do not protect the formation rock in the vapor phase condensation zone.

An amount of a source of a special alkali metal ions is added to the wet steam to form an ion concentration effective to inhibit permeability damage of hydrocarbon formations containing clay minerals in the vicinity of the liquid vapor phase of the injected wet steam and to improve the injectivity of the wet steam into the formation in the vicinity of the liquid phase of the injected wet steam. Preferably, the special alkali metal ion concentration in the liquid phase of the wet steam should be from 0.01 N to 2 N, more preferably from 0.01 N to 1 N. The source of potassium ions can be potassium sulfate, potassium chloride, potassium acetate, potassium nitrate, potassium carbonate, or mixtures thereof.

To determine the desired amount of special alkali metal ions, the preferred method is to take core samples in the region in question and determine the permeability of the core to different solutions containing potassium concentrations, starting at its highest concentration. Permeability is plotted as a function of potassium ion concentration. The results will be a curve of diminishing effect. The decision of a particular desired amount of potassium ions is a trade-off between the cost of the added potassium ions and the value of the increased permeability.

In one embodiment of the present invention, there are three sources of ions: ammonium chloride to supply ammonium ions, potassium chloride to supply potassium ions, and sodium bicarbonate to supply bicarbonate ions. In that embodiment, the three sources are added into the boiler feed water used to generate the wet steam. Sufficient ammonium chloride is added to form an ammonium ions concentration in the vapor phase condensate of the wet steam of from 0.01 N to 0.5 N. Sufficient potassium chloride is added to form a potassium ions concentration in the liquid phase of the wet steam of from 0.01 N to 1 N. Sufficient sodium bicarbonate is added to maintain the pH of the liquid phase of the wet steam to within the range of from 8.5 to 9.5.

In another embodiment, there are only two sources of ions: ammonium chloride to supply ammonium ions, and potassium bicarbonate to supply both potassium ions and bicarbonate ions. In that embodiment, the two sources are added into the boiler feed water used to generate the wet steam. Sufficient ammonium chloride is added to form an ammonium ions concentration in the vapor phase condensate of the wet steam of from 0.01 N to 0.5 N. Sufficient potassium bicarbonate is added to form a potassium ions concentration in the liquid phase of the wet steam of from 0.01 N to 1 N and to maintain the pH of the liquid phase of the wet steam to within the range of from 8.5 to 9.5. While this embodiment has the advantage of eliminating the need for a third source of ions, it is limited to those cases where the amount of potassium ions can equal the amount of added bicarbonate ions.

Additives which are liquid at ambient temperatures can be added directly either to the boiler feedwater or to the steam itself. If added to the steam, the addition can be made either at the surface as the steam is being injected into the formation or down a well penetrating the formation to be treated, or the additive can be injected downhole via a separate conduit and mixed with the steam downhole prior to its entering the formation. Additives which are solids at ambient temperature can be added directly to the feedwater or a concentrated solution thereof can be prepared and then employed as described above for a liquid additive.

While the applicants do not wish to be bound by any particular theory as to how his invention works, it is thought that the following theory may account for the observed beneficial results of the present invention. Clay minerals are made up of layers. Between those layers are ions (such as potassium and sodium) that are neutralized and are not very exchangeable. During steam injection, those ions are slowly removed and are replaced by sodium ions. Those sodium ions have a relatively high hydration energy, so water molecules also go in between the layers with the sodium ions. The hydrated sodium ions are much larger than the potassium ions they replace, and, being larger, they force the layers apart. This leads to particles breaking off and plugging up the flow channels downstream. The hydrated ammonium ions and hydrated potassium ions are much smaller than the hydrated sodium ions, so they do not cause as much damage.

EXAMPLE

The invention will be further illustrated by the following example which set forth particularly advantageous methods and composition embodiments. While the example illustrates the present invention, it is not intended to limit it.

FIG. 1 is a schematic diagram of a field test facility totest this invention. The test facility can be divided into three parts: the injection system, the automatic pH control system, and the corrosion testers.

The Injection System

Steam was injected into a formation at the rate of approximately 800 Bbl/d (cold water equivalent) of feedwater. The average steam quality was about 50%. Two solutions were injected with the feedwater. The first solution, which had 80.0 lb/bbl of potassium chloride (2.86 M) and 15/bbl sodium bicarbonate (0.56 M), was injected at a rate of 500 gal/d. The second solution, which had 50.0 lb/bbl of ammonium chloride (2.42 M) was injected at a rate of 125 gal/d.

Automatic pH Control System

The pH of the liquid fraction of the steam was used to determine the rate of chemical injection. The system consisted of a separator, a pH meter, a microprocessor, and a pump motor speed controller.

The separator was made of two one-inch diameter pipes welded to a section of three-inch steam injection line. The liquid collection pipe was welded to the bottom of the steam line and the vapor collection pipe was welded to the top. The vapor-liquid separation took place within the one-inch pipes. Good separation was achieved as long as the flow rates were kept sufficiently low. The fluids then flowed from the separator through cooling condensers after which the fluid was sampled as warm water.

After the fluid was cooled, the liquid fraction of the steam was allowed to flow continuously from the vapor-liquid separator into a bronze vessel containing pH electrodes. The pH of the solution was monitored with an industrial pH meter system.

The output from the pH meter was sent to a strip chart recorder and a microprocessor proportional controller which was programmed to maintain a specific pH.

The controller which amplified the signal and supplied the appropriate power to alter the speed of the chemical pump motor that pumped the ammonium solution into the steam line.

Corrosion Testers

The corrosion test system was placed directly in the steam line just downstream of the 80-foot pipe. Three methods were used to determine the corrosion rate: corrosion coupons, corrosion nipples, and a corrosimeter.

Although the dissolution of silica decreased as the pH of the residual liquid phase decreased, the corrosion of the well pipe increased dramatically when the pH decreased below 7.5. (See FIG. 2.) Therefore, the pH of that phase should be kept above 7.5.

Since the titration method is difficult to perform in the field, once the bicarbonate concentration is determined, the amount of ammonium salt to be added is adjusted by monitoring the pH of the residual liquid phase of the steam. If the pH is too high, then more salt is added. If the pH is too low, then less ammonium salt is added. The pH should be adjusted through the addition of the compound to the range of from 7.5 to 10.5 for the residual liquid phase.

For a typical 350-barrel per day (BPD) steam injection project with a bicarbonate concentration of 250 ppm, the daily ammonium sulfate salt consumption is about 15 kilograms. The chemical cost is only about 1.5 cents per barrel of injected steam. However, this causes about a 20-fold decrease in the silica dissolution rate at an adjusted pH of about 9.1.

The process is suitable for use within cyclic steam injection or patterned steam injection involving the use of injection wells and production wells, i.e., seven-spot, five-spot, nine-spot, their inverted forms, and the like. In addition, it can be used with surfactants and steam-foam drives. Suitable surfactants are known anionic, cationic or nonionic surfactants. Preferred surfactants for steam-foam enhanced oil recovery drives are known as alpha olefin sulfonates and their dimers as described in U.S. Pat. No. 3,721,707, incorporated herein by reference. Furthermore, the steam drive does not have to be continuous so long as any displacing medium does not substantially alter the preferred pH of the residual liquid phase of the steam in the formation.

What is claimed is:

1. A method for inhibiting permeability damage of a hydrocarbon formation containing clay minerals in the vicinity of a well penetration said formation, comprising:
    (a) injecting a wet steam including an amount of ammonium ions to produce an ammonium ion concentration in the vapor phase condensate of said wet steam effective to inhibit the permeability damage of said formation in the vicinity of the vapor phase, and
    an amount of a bicarbonate salt of the alkali metals, or mixtures thereof, sufficient to raise the pH of the liquid phase of said wet steam to within the range of from about 7.5 to about 10.5; and
    (b) monitoring the pH of the residual liquid phase and continually adjusting the addition of said bicarbonate salt to maintain the pH within the range of from about 7.5 to about 10.5.

2. A method, according to claim 1, wherein the ammonium ion concentration in the vapor phase condensate of said wet steam is less than 2 N.

3. A method, according to claim 2, wherein the ammonium ion concentration in the vapor phase condensate of said wet steam is of from 0.01 N to 0.5 N.

4. A method, according to claim 1, wherein the source of said ammonium ion is selected from the group consisting of ammonium bicarbonate, ammonium carbonate, ammonium sulfate, ammonium chloride, ammonium hydroxide, ammonium acetate, ammonium nitrate, and mixtures thereof.

5. A method, according to claim 1, wherein the source of said ammonium ions is added into the boiler feedwater used to generate said wet steam or into the wet steam itself.

6. A method, according to claim 1, wherein said source of bicarbonate ions is added into the boiler feedwater used to generate said wet steam or into the wet steam itself.

7. A method, according to claim 1, wherein the pH ranges in steps (a) and (b) of claim 1 are both from about 8.5 to about 9.5.

8. A method, according to claim 1, wherein said steam further comprises:
    an amount of a salt of an alkali metal selected from the group consisting of potassium, rubidium, and cesium to form an alkali metal ion concentration in the liquid phase of said wet steam effective to inhibit permeability damage of said formation in the vicinity of the liquid phase of said wet steam.

9. A method, according to claim 8, wherein said alkali metal ion concentration in the liquid phase of said wet steam ranges from about 0.01 to about 1 N.

10. A method, according to claim 8, wherein said alkali metal ion comprises potassium ions.

11. A method, according to claim 10, wherein said source of potassium ions is selected from the group consisting of potassium sulfate, potassium chloride, potassium acetate, potassium nitrate, potassium carbonate, and mixtures thereof.

12. A method, according to claim 8, wherein said source of alkali metal ion is added into the boiler feedwater used to generate said wet steam or into the wet steam itself.

13. A method for inhibiting permeability damage of a hydrocarbon formation containing clay minerals in the vicinity of a well penetrating said formation, comprising:
(a) injecting a wet steam including
an amoutt of ammonium ions to produce an ammonium ion concentration in the vapor phase condensate of said wet steam effective to inhibit the permeability damage of said formation in the vicinity of the vapor phase, and
an amount of a bicarbonate salt of the alkali metals, or mixtures thereof, effective to raise the pH of the liquid phase of said wet steam to with in the range of from about 8.5 to about 9.5, and
an amount of a potassium salt in the liquid phase of said wet steam effective to inhibit permeability damage of said formation in the vicinity of the liquid phase of said wet steam; and
(b) monitoring the pH of the residual liquid phase and continually adjusting the addition of said bicarbonate salt to maintain the pH within the range of from about 9.5 to about 9.5.

14. A method for inhibiting permeability damage of a hydrocarbon formation containing clay minerals in the vicinity of a well penetration said formation, comprising;
(a) injecting a wet steam including an amount of ammonium ions to produce an ammonium ion concentration in the vapor phase condensate of said wet steam effective to inhibit the permeability damage of said formation in the vicinity of the vapor phase, and
an amount of a bicarbonate salt of the alkali metals, or mixtures thereof, sufficient to raise the pH of the liquid phase of said wet steam to within the range of from about 7.5 to about 10.5; and
(b) monitoring the pH of the residual liquid phase and adjusting the addition of said bicarbonate salt to continually maintain the pH within the range of from about 7.5 to about 10.5.

15. A method for inhibitig permeability damage of a hydrocarbon formation containing clay minerals, and formation penetrated by an injection well and a production well, comprising:
(a) injecting through an injection well a wet steam including an amount of ammonium ions to produce an ammonium ion concentration in the vapor phase condensate of said wet steam effective to inhibit the permeability damage of said formation, and
an amount of a bicarbonate salt of the alkali metals, or mixtures thereof, sufficient to raise the pH of the liquid phase of said wet steam to within the range of from about 7.5 to about 10.5;
(b) monitoring the pH of the residual liquid phase and continually adjusting the addition of said bicarbonate salt to maintain the pH within the range of from about 7.5 to about 10.5, and
(c) recovering hydrocarbons from said formation through said production well.

16. A method, according to claim 15, wherein the ammonium ion concentration in the vapor phase condensate of said wet steam is less than 2 N.

17. A method, according to claim 15, wherein the source of said ammonium ion is selected from the group consisting of ammonium bicarbonate, ammonium carbonate, ammonium sulfate, ammonium chloride, ammonium hydroxide, ammonium acetate, ammonium nitrate, and mixtures thereof.

18. A method, according to claim 15, wherein the source of said ammonium ions is added into the boiler feedwater used to generate said wet steam or into the wet steam itself.

19. A method, according to claim 15, wherein said source of bicarbonate ions is added into the boiler feedwater used to generate said wet steam or into the wet steam itself.

20. A method, according to claim 15, wherein the pH ranges in steps (a) and (b) of claim 1 are both from about 8.5 to about 9.5.

21. A method, according to claim 15, wherein said steam further comprises:
an amount of a salt of an alkali metal selected from the group consisting of potassium, rubidium, and cesium to form an alkali metal ion concentration in the liquid phase of said wet steam effective to inhibit permeability damage of said formation in the vicinity of the liquid phase of said wet steam.

22. A method, according to claim 21, wherein said alkali metal ion concentration in the liquid phase of said wet steam ranges from about 0.01 to about 1 N.

23. A method, according to claim 21, wherein said alkali metal ion comprises potassium ions.

24. A method, according to claim 23, wherein said source of potassium ions is selected from the group consisting of potassium sulfate, potassium chloride, potassium acetate, potassium nitrate, potassium carbonate, and mixtures thereof.

25. A method, according to claim 21, wherein said source of alkali metal ion is added into the boiler feedwater used to generate said wet steam or into the wet steam itself.

* * * * *